United States Patent
Cho et al.

(10) Patent No.: US 9,485,483 B2
(45) Date of Patent: Nov. 1, 2016

(54) IMAGE SENSOR AND IMAGE SENSOR SYSTEM INCLUDING THE SAME

(71) Applicant: SAMSUNG ELECTRONICS CO., LTD., Suwon-Si, Gyeonggi-Do (KR)

(72) Inventors: Sung-Kwang Cho, Seoul (KR); Dae-Kwan Kim, Suwon-si (KR); Tae-Chan Kim, Yongin-si (KR); Hyung-Gu Lee, Gimpo-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/607,127

(22) Filed: Jan. 28, 2015

(65) Prior Publication Data
US 2015/0296194 A1  Oct. 15, 2015

(30) Foreign Application Priority Data
Apr. 9, 2014  (KR) .................. 10-2014-0042186

(51) Int. Cl.
| | | |
|---|---|---|
| H04N 13/04 | (2006.01) | |
| H01L 27/00 | (2006.01) | |
| G06K 9/00 | (2006.01) | |
| H04N 9/73 | (2006.01) | |
| G03B 11/00 | (2006.01) | |
| G02B 5/30 | (2006.01) | |
| G02B 3/00 | (2006.01) | |

(52) U.S. Cl.
CPC ............ *H04N 9/735* (2013.01); *G02B 3/0056* (2013.01); *G02B 5/30* (2013.01); *G03B 11/00* (2013.01)

(58) Field of Classification Search
CPC ...... H04N 9/64; H04N 5/2254; H04N 9/735; H04N 9/3167; G02B 5/30; G06T 2207/10052; G06T 2200/21; H01L 27/14627

USPC .................. 348/57, 58, 294–324; 382/162; 250/208.1; 359/483
See application file for complete search history.

(56) References Cited

U.S. PATENT DOCUMENTS

| | | |
|---|---|---|
| 6,727,942 B1 | 4/2004 | Miyano |
| 6,956,469 B2 | 10/2005 | Hirvonen et al. |
| 7,206,000 B2 | 4/2007 | Zitnick, III et al. |
| 8,331,627 B2 | 12/2012 | Xiong et al. |
| 8,428,342 B2 | 4/2013 | Tian et al. |
| 8,446,488 B2 | 5/2013 | Yim |
| 8,456,483 B2 | 6/2013 | Han |
| 8,687,052 B2 | 4/2014 | Ha et al. |
| 2007/0002159 A1* | 1/2007 | Olsen ............... G02B 7/04 348/335 |
| 2007/0047803 A1* | 3/2007 | Nikkanen ......... H04N 9/735 382/162 |

(Continued)

FOREIGN PATENT DOCUMENTS

| | | |
|---|---|---|
| KR | 0888537 B | 3/2009 |
| KR | 0938265 B1 | 1/2010 |

(Continued)

*Primary Examiner* — Sinh Tran
*Assistant Examiner* — Xi Wang
(74) *Attorney, Agent, or Firm* — Volentine & Whitt, PLLC (57) ABSTRACT

An image sensor includes a pixel array, a micro lens array and polarizing filters. The pixel array includes a plurality of pixels. The micro lens array is disposed on the pixel array and includes a plurality of micro lenses. The micro lens overlaps a pixel group of the pixel array. The polarizing filter is disposed on the micro lens and includes a plurality of polarizing filters having at least two different polarizing phases. Accordingly, the accuracy and the reliability of the local auto white balancing may be improved.

14 Claims, 8 Drawing Sheets

(56) References Cited

U.S. PATENT DOCUMENTS

| | | | |
|---|---|---|---|
| 2009/0021602 A1* | 1/2009 | Fujiwara | H04N 9/735 348/223.1 |
| 2009/0244316 A1 | 10/2009 | De Haan | |
| 2010/0045844 A1* | 2/2010 | Yamamoto | H04N 5/2254 348/340 |
| 2010/0289878 A1* | 11/2010 | Sato | H04N 13/0239 348/46 |
| 2010/0303344 A1* | 12/2010 | Sato | G06T 7/0081 382/162 |
| 2011/0043623 A1* | 2/2011 | Fukuta | G02B 27/0018 348/135 |
| 2011/0175983 A1 | 7/2011 | Park et al. | |
| 2013/0075585 A1* | 3/2013 | Kobayashi | H01L 27/146 250/208.1 |

FOREIGN PATENT DOCUMENTS

| | | |
|---|---|---|
| KR | 20110084029 A | 7/2011 |
| KR | 1090349 B | 11/2011 |
| KR | 1092376 B1 | 12/2011 |

* cited by examiner

IMAGE SENSOR AND IMAGE SENSOR SYSTEM INCLUDING THE SAME

PRIORITY STATEMENT

This application claims priority under 35 USC §119 to Korean Patent Application No. 10-2014-0042186, filed on Apr. 9, 2014 in the Korean Intellectual Property Office (KIPO), the contents of which are herein incorporated by reference in their entirety.

BACKGROUND

1. Technical Field

The inventive concept relates generally to image sensors. More particularly, the inventive concept relates to image sensors including a pixel array and micro lenses for focusing light onto the pixels of the array.

2. Description of the Related Art

Generally, an image sensor system includes an image sensor and a signal processor processing image information produced by the image sensor.

The image sensor may include a semiconductor device that transforms incident light into an electric signal (i.e., performs photoelectric transformation) to provide image information corresponding to the incident light.

The image sensor system may conduct image interpolation, color correction, auto white balancing ("AWB"), gamma correction, color conversion, etc. on the image information.

In a conventional auto white balancing method, candidate light sources are determined by statistical analysis of the image, a light source (e.g., daylight, an artificial light source) which has a highest probability of producing the image is selected, and auto white balancing is performed based on the assumption that that the image is being produced under light cast by the selected light source.

In the conventional method, input image data is merely used to conduct the auto white balancing. Therefore, auto white balancing may produce poor results when the input image data represents a monochromatic image or various light sources exist.

SUMMARY

According to one aspect of the inventive concept, there is provided an image sensor comprising a pixel array including a plurality of pixels, and a micro lens array disposed on the pixel array and including a plurality of micro lenses and a plurality of polarizing filters, and in which each of the micro lenses is juxtaposed with a respective group of pixels of the pixel array, each of the polarizing filters is disposed on one of the micro lenses, and the polarizing filters have at least two different polarizing phases.

According to another aspect of the inventive concept there is provided an image sensor system, comprising an image sensor that generates signals representing an input image, and a signal processor operatively connected to the image sensor the image sensor, and in which the image sensor comprises a pixel array including a plurality of pixels, and a micro lens array disposed on the pixel array and including a plurality of micro lenses and a plurality of polarizing filters, and in which each of the micro lenses is juxtaposed with a respective group of pixels of the pixel array, each of the polarizing filters is disposed on one of the micro lenses, the polarizing filters have at least two different polarizing phases, and the signal processor is configured to generate a plurality of polarized sub images based on the input image and to conduct an auto white balancing process based on the polarized sub images.

According to still aspect of the inventive concept, there is provided an image sensor comprising an array of pixels that convert incident light to electronic signals, an array of micro lenses optically aligned with the pixels so as to direct light onto the pixels, and polarizers optically aligned with the micro lenses such that light directed onto the pixels in the sensor by the micro lenses is polarized by the polarizers, and in which the polarizers have transmission axes that are substantially parallel, and respective ones of the polarizers having transmission orientations different from one another. A signal processor may be operatively connected to the image sensor and configured to conduct an auto white balancing process based on the signals produced by the pixels.

BRIEF DESCRIPTION OF THE DRAWINGS

Illustrative, non-limiting embodiments will be described in more detail in the detailed description that follows made in conjunction with the accompanying drawings.

DETAILED DESCRIPTION OF THE PREFERRED EMBODIMENTS

Various embodiments and examples of embodiments of the inventive concept will be described more fully hereinafter with reference to the accompanying drawings. Like numerals are used to designate like elements throughout the drawings.

Other terminology used herein for the purpose of describing particular examples or embodiments of the inventive concept is to be taken in context. For example, the terms "comprises" or "comprising" when used in this specification specifies the presence of stated features or processes but does not preclude the presence or additional features or processes. The term "row" or "column" will be used to refer to the elements that collectively make up, i.e., are arranged in, such a row or column. The term "juxtaposed" will generally refer to an alignment in an optical sense, i.e., will generally be used to describe a relative positioning of two elements in which the optical axes of the elements are aligned.

An embodiment of an image sensor system according to the inventive concept will now be described in detail with reference to FIG. 1.

The image sensor system includes an image sensor and a signal processor. The image sensor includes a pixel array 100 and a micro lens array 200. The signal processor includes a row driver 300, an analog to digital converter ("ADC") 400, a digital signal processor ("DSP") 500 and a controller 600.

The pixel array 100 includes a plurality of pixels. The pixels are disposed in a matrix (e.g., the pixel array includes rows and columns of pixels).

The pixel array 100 generates a plurality of pixel signals based on incident light. For example, the pixel signals may be analog pixel signals. Each pixel may include a photoelectric conversion unit that transforms incident light into an electric signal.

The micro lens array 200 is disposed on the pixel array 100. The micro lens array 200 includes a plurality of micro lenses covered with polarizers (referred to hereinafter as "polarizing filters"). The micro lenses of the micro lens array 200 are juxtaposed with the pixels of the pixel array 100, as will be described in more detail later on with reference to FIGS. 2 and 3.

The signal processor generates image data based on the plurality of pixel signals.

The row driver 300 is connected to each row of the pixel array 100. The row driver 300 may issue driving signals to drive each row. For example, the row driver 300 may drive the plurality of pixels of the pixel array 100 row by row.

The ADC 400 is connected to each column of the pixel array 100. The ADC 400 may convert analog signals (e.g., the pixel signals) outputted from the pixel array 100 into digital signals (e.g., the image data). In one example of this embodiment, the ADC 400 performs a column analog-to-digital conversion that converts the analog signals in parallel (e.g., simultaneously or concurrently) using a plurality of analog-to-digital converters respectively coupled to the plurality of columns. In another example, the ADC 400 performs a single analog-to-digital conversion that sequentially converts the analog signals using a single analog-to-digital converter.

In one embodiment, the ADC 400 further includes a single correlated double sampling ("CDS") unit for extracting an effective signal component.

In an example of this embodiment, the CDS unit performs an analog double sampling that extracts the effective signal component based on a difference between an analog reset signal including a reset component and an analog data signal including a signal component.

In another example, the CDS unit performs a digital double sampling that converts the analog reset signal and the analog data signal into two digital signals and extracts the effective signal component based on a difference between the two digital signals.

In still another example, the CDS unit performs a dual correlated double sampling that includes both the analog double sampling and the digital double sampling processes.

The DSP 500 may receive the digital signals output from the ADC 400, and may perform an image data processing of the digital signals.

For example, the DSP 500 may conduct auto white balancing, image interpolation, color correction, gamma correction, color conversion, refocusing, etc., in the system.

A structure and an operation of the DSP 500 will be described in more detail later on with reference to FIGS. 4 to 9.

The controller 600 may control the row driver 300, the ADC 400 and the DSP 500. To this end, the controller 600 may provide control signals, such as a clock signal, a timing control signal, or the like to control the row driver 300, the ADC 400 and the DSP 500.

The controller 600 may include a logic control circuit, a phase locked loop ("PLL") circuit, a timing control circuit, a communication interface circuit, etc.

Figure 1:
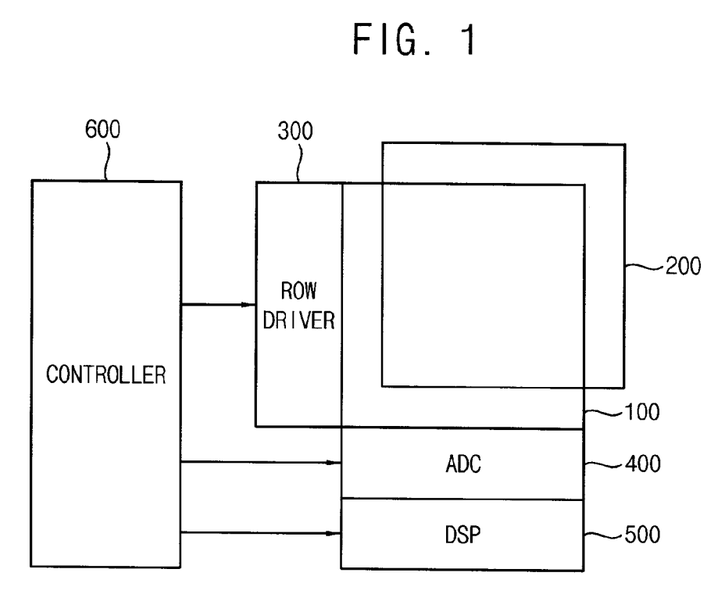
FIG. 1 is a block diagram of one embodiment of an image sensor system according to the inventive concept.
Figure 2:
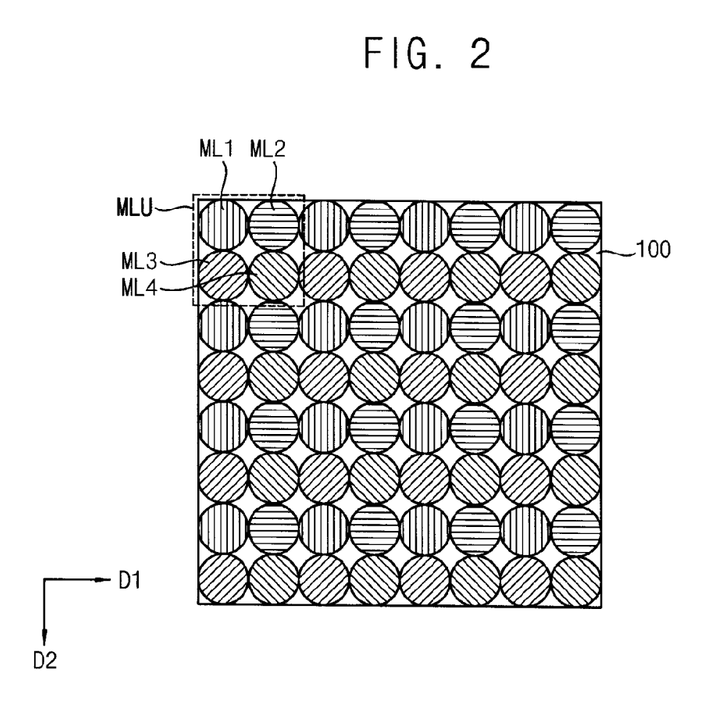
FIG. 2 is a plan view of a pixel array and a micro lens array of the image sensor system of FIG. 1.
Figure 3:
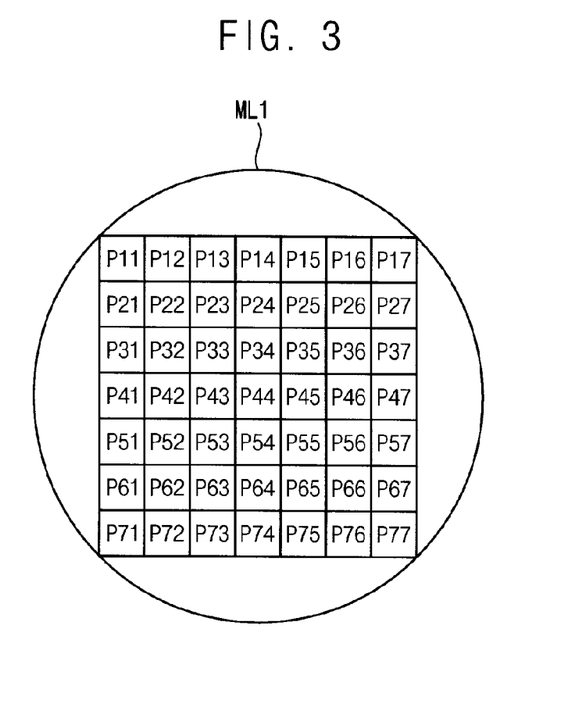
FIG. 3 is a plan view of a micro lens and a pixel group juxtaposed with the micro lens of the image sensor system of the system of FIG. 1.

Referring to FIGS. 1 to 3, the micro lens array 200 includes a plurality of micro lenses that direct or focus light onto the pixels. The micro lenses are disposed in a matrix. The micro lens array 200 also includes a plurality of polarizing filters disposed on the micro lenses as optically aligned therewith. The polarizing filters have at least two different transmission orientations which may be referred to hereinafter as "polarizing phases" (examples of which are described below).

In an example of this embodiment, the micro lens array 200 includes a plurality of micro lens units MLU. Each micro lens unit MLU includes a first micro lens ML1, a second micro lens ML2, a third micro lens ML3 and a fourth micro lens ML4.

The second micro lens ML2 is adjacent to the first micro lens ML1 in a first direction D1. The third micro lens ML3 is adjacent to the first micro lens ML1 in a second direction D2 crossing the first direction D1. The fourth micro lens ML4 is adjacent to the third micro lens ML3 in the first direction D1. The second direction D2 may be perpendicular to the first direction D1. In this respect, the direction in which the micro lenses are "adjacent" refers to the direction along which the geometric centers or optical axes of the micro lenses lie.

Also, in this example, the polarizing filters include a first polarizing filter having a first polarizing phase is disposed on the first micro lens ML1. A second polarizing filter having a second polarizing phase is disposed on the second micro lens ML2. The second polarizing phase is different from the first polarizing phase (first angle). A third polarizing filter having a third polarizing phase is disposed on the third micro lens ML3. The third polarizing phase is different from the first polarizing phase and the second polarizing phase. A fourth polarizing filter having a fourth polarizing phase is disposed on the fourth micro lens ML4. The fourth polarizing phase is different from each of the first to third polarizing phases.

In an example in which the polarizing filters are linear polarizers, the transmission orientation or polarizing phase refers to the angle subtended between the plane in which the transmitted light is linearly polarized and a reference plane parallel to the transmission axis of the polarizer.

For example, the first angle may be zero degrees with respect to a reference plane aligned with the second direction D2. In other word, the first polarizing phase may be parallel to the second direction D2. The second angle may be 90 degrees with respect to the reference plane. In other word, the second polarizing phase may be perpendicular to the second direction D2. The third angle may be 45 degrees clockwise with respect to the reference plane. The fourth polarizing phase may be 135 degrees clockwise with respect to the reference plane.

Although an example has been described in which the micro lens unit MLU includes polarizing filters having four different polarizing phases, the present inventive concept is not limited to any particular number of different polarizing phases. For example, the micro lens unit MLU may include first and second micro lenses and polarizing filters having only two different polarizing phases. In this case, a direction of a first polarizing phase of a polarizing filter juxtaposed with the first micro lens may be perpendicular to a direction of a second polarizing phase of a polarizing filter juxtaposed with the second micro lens. As another example, the micro lens unit MLU may include first through sixth micro lenses and polarizing filters having six different polarizing phases. In this example, directions of a first polarizing phase of a polarizing filter juxtaposed with the first micro lens, a second polarizing phase of a polarizing filter juxtaposed with the second micro lens, a third polarizing phase of a polarizing filter juxtaposed with the third micro lens, a fourth polarizing phase of a polarizing filter juxtaposed with the fourth micro lens, a fifth polarizing phase of a polarizing filter juxtaposed with a fifth micro lens and a sixth polarizing phase of a polarizing filter juxtaposed with a sixth micro lens may be 30 degrees apart from each other in a clockwise direction beginning at a reference plane aligned with the second direction D2.

Referring still to FIGS. 1-3 and, in particular, to FIG. 2, in the illustrated example of this embodiment, micro lenses in a first row (direction D1) respectively face micro lenses in a second row adjacent to the first row in the second direction. Thus, geometric centers or optical axes of the first to fourth micro lenses ML1, ML2, ML3 and ML4 may substantially lie at the corners of a square, respectively.

A single micro lens may overlap a single pixel group (i.e., a respective group of pixels). For example, the pixel group may include seven rows and seven columns of pixels as shown in FIG. 3. The first micro lens ML1 may cover first to seven pixels P11 to P17 in a first pixel row, first to seven pixels P21 to P27 in a second pixel row, first to seven pixels P31 to P37 in a third pixel row, first to seven pixels P41 to P47 in a fourth pixel row, first to seven pixels P51 to P57 in a fifth pixel row, first to seven pixels P61 to P67 in a sixth pixel row and first to seven pixels P71 to P77 in a seventh pixel row.

However, the present inventive concept is not limited to the number of the pixels in a pixel group covered by a respective micro lens.

An example of a device that may include the image sensor is a light field camera. The image sensor may store various image signals corresponding to the number of pixels in the pixel group juxtaposed with each micro lens. In the present embodiment, therefore, the image sensor may store 49 different image signals for each micro lens in the array 200.

Figure 4:
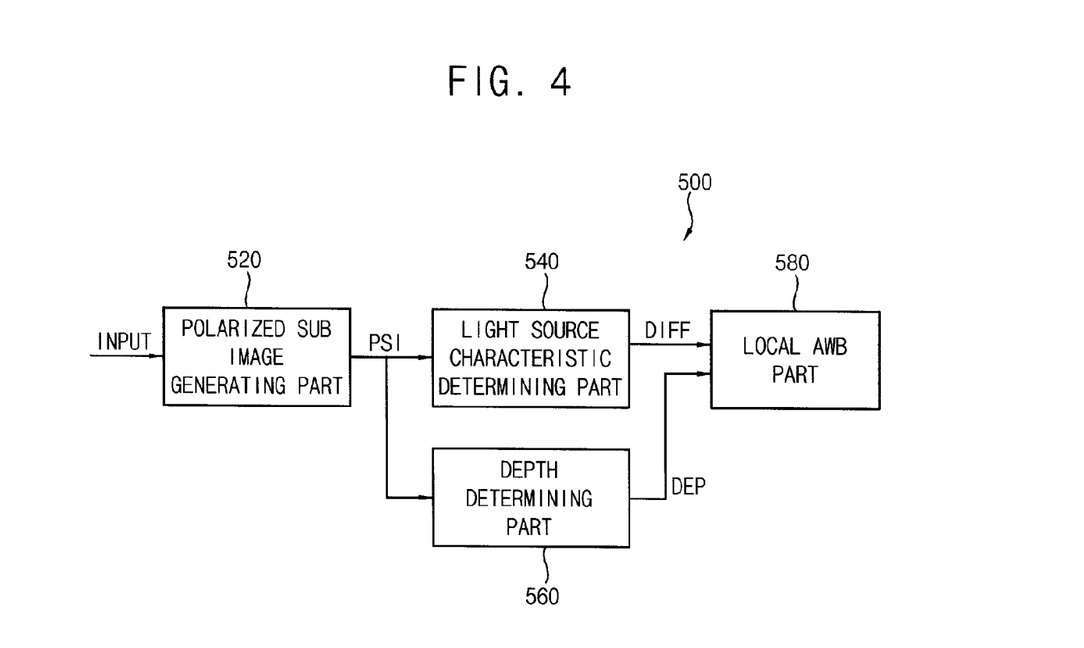
FIG. 4 is a block diagram of a digital signal processor of the system of FIG. 1.

Referring now to FIGS. 1 and 4, the digital signal processor 500 generates a plurality of polarized sub images PSI based on the input image INPUT generated by the image sensor. The digital signal processor 500 conducts the auto white balancing based on the polarized sub images PSI.

White balancing is an operation in which the color of a displayed image is enhanced, to be more realistic, by removing components of light (unrealistic color casts) from the sensed image information. For example, if a light source producing light having a relatively high color temperature irradiates an object, the color of the image produced by a digital image sensor system may appear bluer than the original object as perceived by the human eye. Thus, in this case, the image sensor system is required to exclude a blue cast from a display of the image so that the image appears more like that which would be perceived by the human eye. Likewise, when a light source having a relatively low color temperature irradiates an object, the color of the image may appear redder than the object as perceived by the human eye. Thus, in this case, the image sensor system is required to exclude a red cast from a display of the image.

In the present embodiment, the input image INPUT may be the analog pixel signals generated by the pixels of the image sensor. Alternatively, the input image INPUT may be the digital pixel signals which are converted from the analog pixel signals by the ADC 400 of the image sensor.

The DSP 500 includes a polarized sub image generating part 520, a light source characteristic determining part 540, a depth determining part 560 and a local auto white balancing ("AWB") part 580.

The polarized sub image generating part 520 generates the polarized sub images PSI based on the input image INPUT.

The input image INPUT may include a number of image signals corresponding to the number of pixels of a pixel group.

Figure 5:
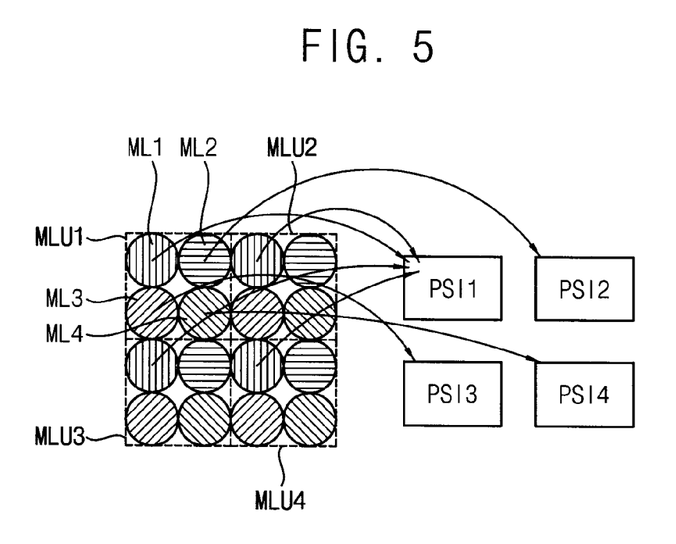
FIG. 5 is a conceptual diagram illustrating an operation of a polarized sub image generating part of the digital signal processor of FIG. 4.

Referring to FIG. 5, the polarized sub image generating part 520 collects the image signals produced by the pixel group receiving incident light through the first polarizing filter to generate a first polarized sub image PSI1. The polarized sub image generating part 520 collects the image signals produced by the pixel group receiving incident light through the second polarizing filter to generate a second polarized sub image PSI2. The polarized sub image generating part 520 collects the image signals produced by the pixel group receiving incident light through the third polarizing filter to generate a third polarized sub image PSI3. The polarized sub image generating part 520 collects the image signals produced by the pixel group receiving incident light through the fourth polarizing filter to generate a fourth polarized sub image PSI4.

The polarized sub image generating part 520 may select the image signals produced by the central pixels of the pixel groups to generate the polarized sub images PSI. Using the first polarized sub image PSI1 as an example, the polarized sub image generating part 520 may select the image signals produced by the central pixels of the pixel groups receiving incident light through the first polarizing filters ML1 of the micro lens groups MLU1, MLU2, MLU3, MLU4 . . . to generate the polarized sub image PSI1.

The light source characteristic determining part 540 determines a characteristic value DIFF of a light source which corresponds to a difference between the polarized sub images PSI.

The light source characteristic determining part 540 may determine the characteristic value DIFF of the light source by subtracting a minimum polarized sub image grayscale value Rmin, Gmin, Bmin from a maximum polarized sub image grayscale value RMAX, GMAX, BMAX, wherein the minimum polarized sub image grayscale value Rmin, Gmin, Bmin, is a value of the minimum luminance among those of the first to fourth polarized sub images PSI1, PSI2, PSI3 and PSI4, and the maximum polarized sub image grayscale value RMAX, GMAX, BMAX is a value of the maximum luminance among those of the first to fourth polarized sub images PSI1, PSI2, PSI3 and PSI4. Thus, the characteristic value DIFF of the light source may have a red grayscale value which is RMAX-Rmin, a green grayscale value which is GMAX-Gmin and a blue grayscale value which is BMAX-Bmin.

Figure 6:
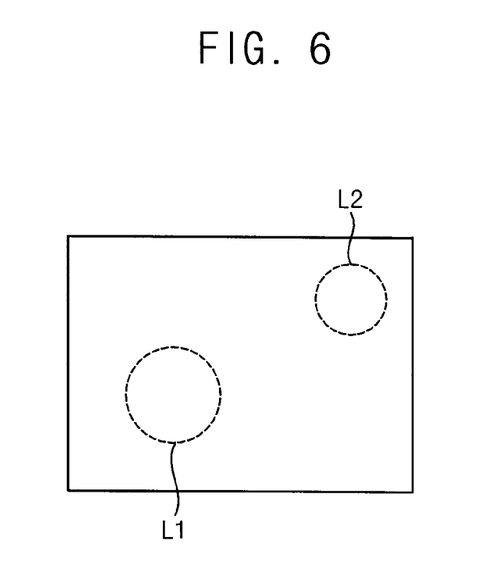
FIG. 6 is a conceptual diagram illustrating an operation of the light source characteristic determining part of the digital signal processor of FIG. 4.

FIG. 6 represents a difference image (a difference between the polarized sub images PSI). The difference image represents a distribution of the characteristic value DIFF of the light source. FIG. 6 illustrates an example in which a light source having a relatively high color temperature irradiates a left front portion of the object and a light source having a relatively low color temperature irradiates a right rear portion of the object, such that the difference image exhibits a blue area L1 and a red area L2.

The depth determining part 560 determines the depth DEP of the input image INPUT based on the polarized sub images PSI.

For example, the depth determining part 560 may determine the depth DEP using a first disparity in the first direction D1 in the pixel group juxtaposed with the micro lens and a second disparity in the second direction D2 crossing the first direction D1 in the pixel group juxtaposed with the micro lens.

The depth determining part 560 may average the first polarized sub image PSI1 corresponding to the first polarizing filter, the second polarized sub image PSI2 corresponding to the second polarizing filter, the third polarized sub image PSI3 corresponding to the third polarizing filter and the fourth polarized sub image PSI4 corresponding to the fourth polarizing filter to determine the first disparity and the second disparity.

Alternatively, the depth determining part 560 may select one of the first to fourth polarized sub images PSI1 to PSI4 to determine the first disparity and the second disparity.

The depth determining part 560 may use images IP41 to IP47 corresponding to the first to seventh pixels P41 to P47 in the fourth row to determine the first disparity in the first direction D1.

Figure 7A:
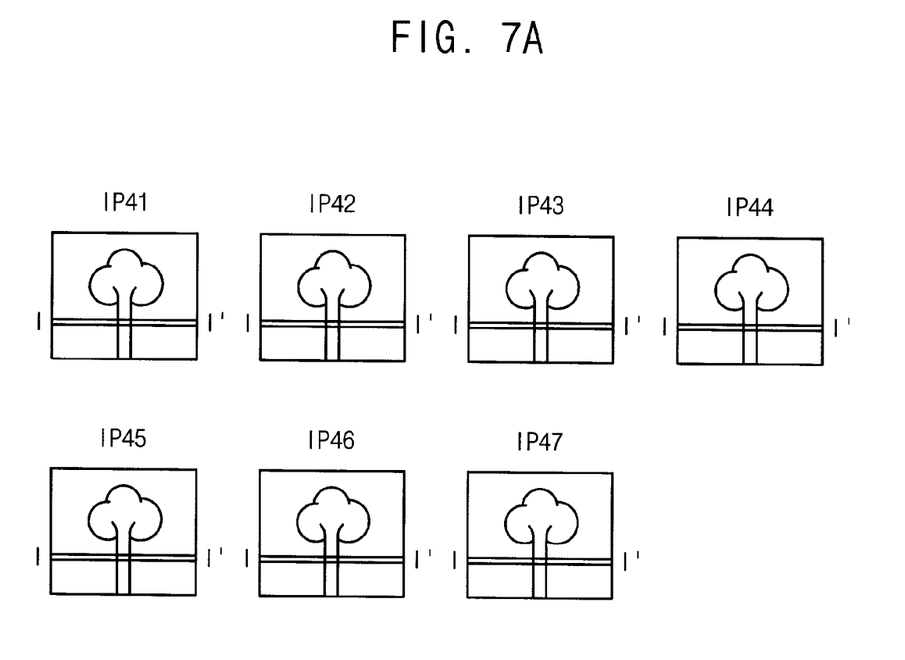
FIGS. 7A, 7B, 7C, 7D and 8 are conceptual diagrams illustrating an operation of the depth determining part of the digital signal processor of FIG. 4.
Figure 7B:
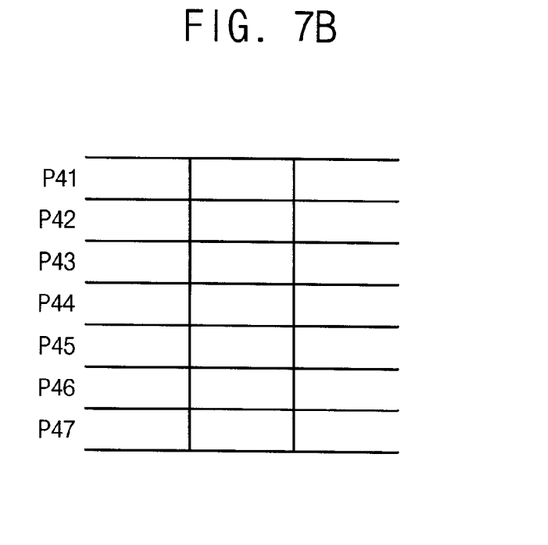

FIGS. 7A and 7B represents the first disparity of the input image INPUT in a case in which the depth of the input image INPUT is relatively high.

In this case, the first image IP41, corresponding to the first pixel P41, to the seventh image IP47, corresponding to the seventh pixel P47 in the fourth pixel row, appear the same. In FIG. 7B, portions of the images taken along a line I-I' of the first to seventh images IP41 to IP47 are vertically disposed. The portions taken along a line I-I' of the first to seventh images IP41 to IP47 are not inclined in FIG. 7B.

Figure 7C:
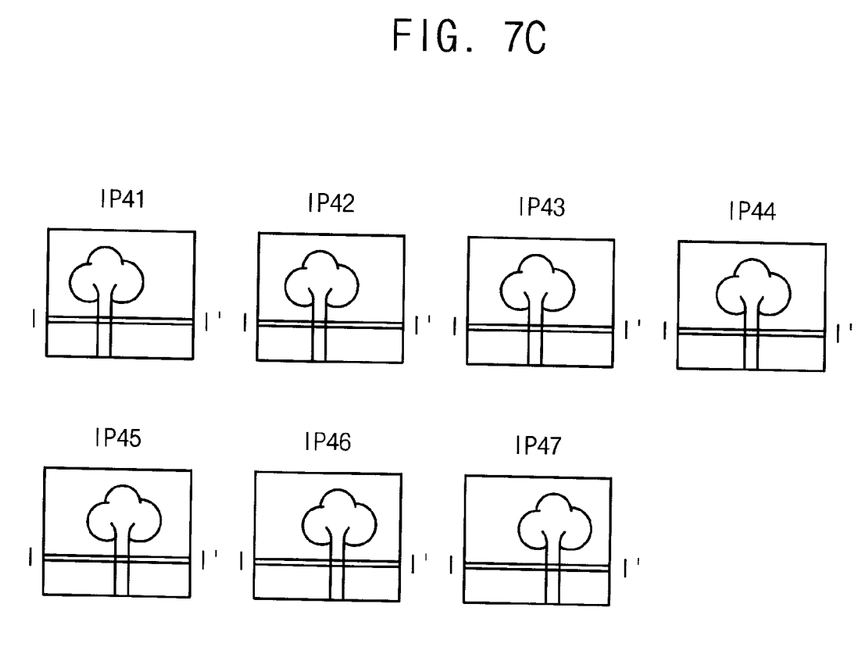
Figure 7D:
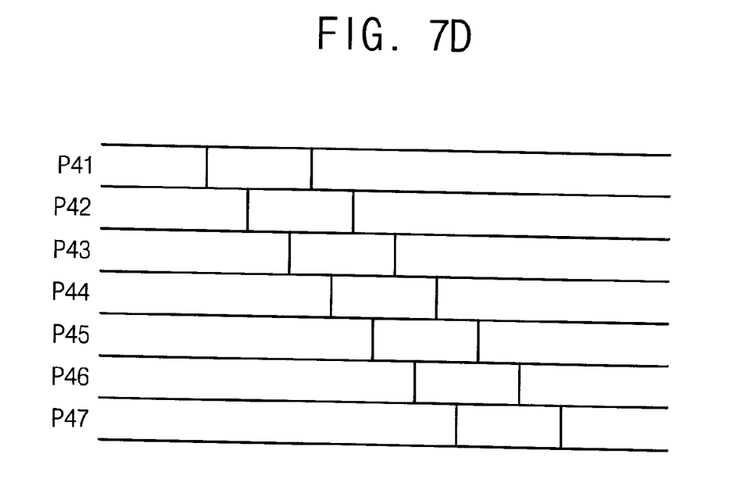

FIGS. 7C and 7D represents the first disparity of the input image INPUT in a case in which the depth of the input image INPUT is relatively low.

In this case, positions of the first image IP41, corresponding to the first pixel P41, to the seventh image IP47, corresponding to the seventh pixel P47 in the fourth pixel row, are shifted relative to one another. In FIG. 7D, portions taken along a line I-I' of the first to seventh images IP41 to IP47 are vertically disposed. The portions taken along a line I-I' of the first to seventh images IP41 to IP47 are inclined in FIG. 7D.

Although not shown in figures, the depth determining part 560 may in a similar way use images IP14 to IP74 corresponding to the first to seventh pixels P41 to P47 in the fourth column in FIG. 3 to determine the second disparity in the second direction D2.

Figure 8:
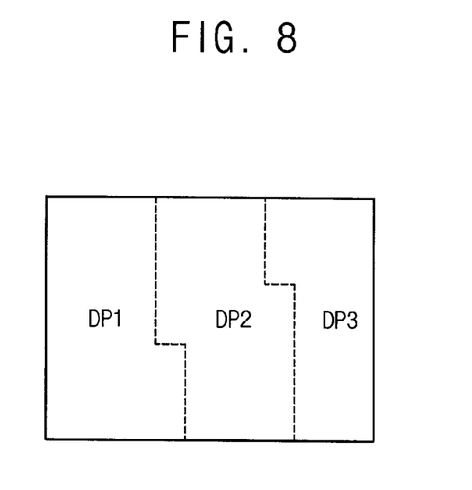
Figure 9:
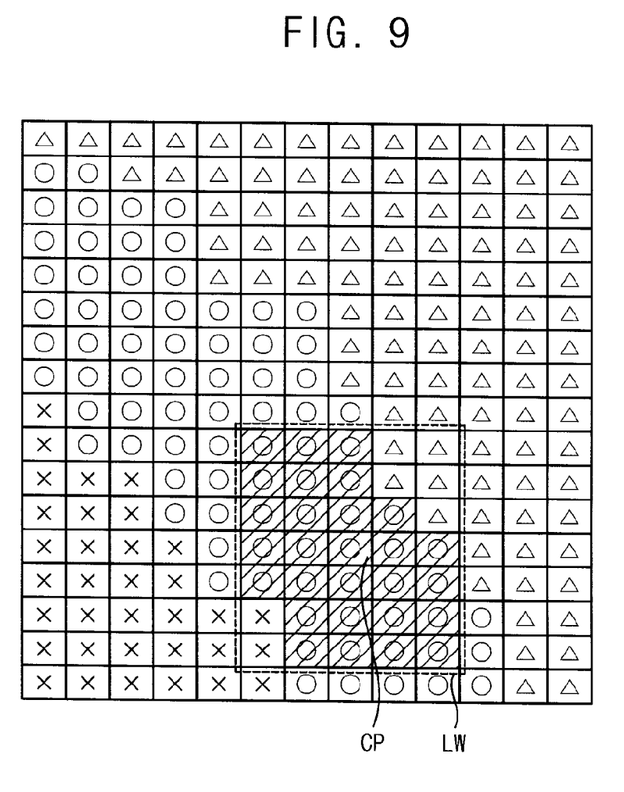
FIG. 9 is a conceptual diagram illustrating an operation of the local auto white balancing part of the digital signal processor of FIG. 4.

FIG. 8 represents an example of a distribution of the depth DEP of the input image INPUT. For example, a left lower portion of the input image INPUT has a first depth DP1, a central portion of the input image INPUT has a second depth DP2 and a right upper portion of the input image INPUT has a third depth DP3. FIG. 9 illustrates an operation of the local auto white balancing part of the digital signal processor of FIG. 4.

Referring to FIGS. 4, 8 and 9, the local AWB part 580 conducts the local auto white balancing based on the characteristic value DIFF of the light source and the depth DEP.

The local AWB part 580 may conduct the local auto white balancing by multiplying the input image INPUT by a white balancing compensating value. The white balancing compensating value may be a value of the gain for the R, G and B.

For example, when the characteristic value DIFF of the light source has a ratio 2:1:1 for R, G and B, it may be determined that the image signals of the pixel group are representing an excess amount of red light. Thus, the white balancing compensating value may have a ratio 1/2:1:1 for R, G and B to remove a red cast.

In FIG. 9, the first depth is represented as X, the second depth is represented as O and the third depth is represented as A.

The local AWB part 580 may generate the white balancing compensating value using the characteristic value DIFF of the light source in a local window LW which has the same depth as the depth of an image represented by image signals from a central pixel group CP corresponding to a center of the local window LW.

In FIG. 9, the depth of the image represented by image signals from central pixel group CP of the local window LW is the second depth O. Therefore, the local AWB part 580 may generate the white balancing compensating value using the characteristic value DIFF of the light source of the pixel groups in the local window LW corresponding to the second depth O.

For example, the white balancing compensating value may be determined as the most frequent characteristic value DIFF among histograms of the characteristic values DIFF of the pixel groups in the local window LW which has a depth same as a depth of the central pixel group CP corresponding to a center of the local window LW.

For example, the histogram may be a two-dimensional histogram including a first coordinate of a normalized red grayscale and a second coordinate of a normalized blue grayscale. In this example, the normalized red grayscale may be represented as R/(R+G+B) and the normalized blue grayscale may be represented as B/(R+G+B).

Alternatively, the white balancing compensating value may be determined as the weighted sum of the characteristic values DIFF of the pixel groups in the local window LW which has a depth same as a depth of the central pixel group CP corresponding to a center of the local window LW. A weight may set great as the distance from the central pixel group CP is small.

Alternatively, the white balancing compensating value may be determined as the average of the characteristic values DIFF of the pixel groups in the local window LW which has a depth same as a depth of the central pixel group CP corresponding to a center of the local window LW.

Although the local window LW covers the pixel groups in five rows and seven columns in the present exemplary embodiment, the present inventive concept is not limited to the size of the local window LW.

The DSP 500 may further include a refocusing part adjusting a focal point using the images of the plurality of pixels corresponding to the micro lens.

The DSP 500 may further include an image compensating part to conduct the gamma correction and the color correction for the sensed image.

According to the present embodiment, the DSP 500 may determine the characteristic value DIFF of the light source using the plurality of the polarized sub images and the depth DEP of the input image using the micro lens covering the pixel group. The local auto white balancing is conducted using the characteristic value DIFF of the light source and the depth DEP of the input image so that the accuracy and the reliability of the local auto white balancing may be improved.

Figure 10:
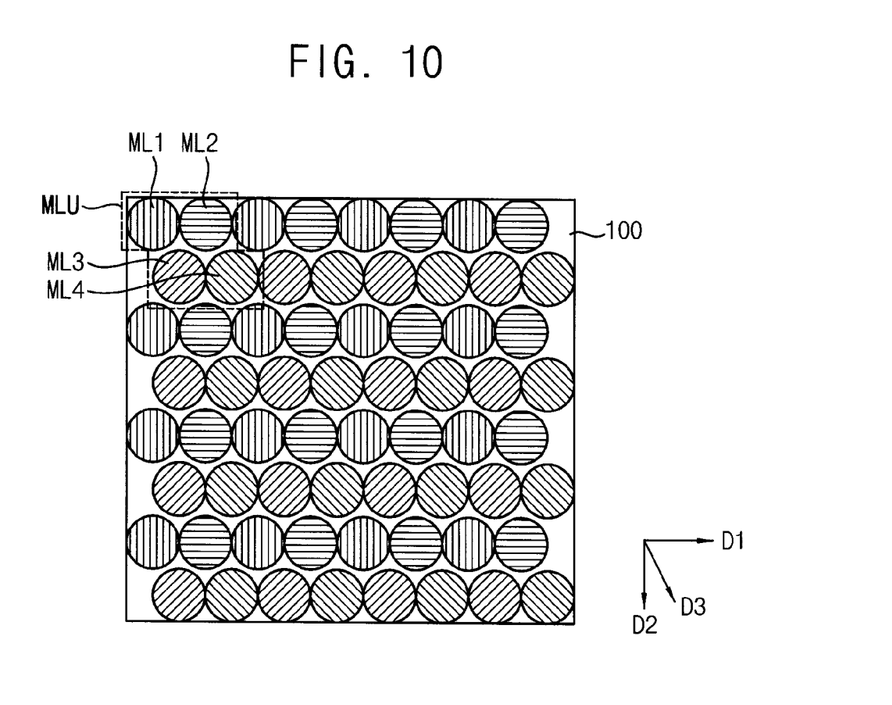
FIG. 10 is a plan view illustrating another example of a pixel array and a micro lens array of an image sensor according to the inventive concept.

FIG. 10 illustrates another example of a pixel array and a micro lens array of an image sensor according to the inventive concept.

Referring to FIGS. 1, 3 and 10, the pixel array 100 includes a plurality of pixels. The pixels are disposed in a matrix form.

For example, the micro lens array 200 includes a plurality of micro lens unit MLU. The micro lens unit MLU includes a first micro lens ML1, a second micro lens ML2, a third micro lens ML3 and a fourth micro lens ML4.

The second micro lens ML2 is adjacent to the first micro lens ML1 in a first direction D1. The third micro lens ML3 is adjacent to the first micro lens ML1 in a third direction D3 crossing the first direction D1. The fourth micro lens ML4 is adjacent to the third micro lens ML3 in the first direction D1. The third direction D3 is oblique with respect to the first direction D1. For example, the third direction D3 may subtend an angle of about sixty degrees with the first direction D1. In this respect, as was the case with the description of the example of FIG. 2, the direction in which the micro lenses are "adjacent" refers to the direction along which the geometric centers or optical axes of the micro lenses lie.

Therefore, micro lenses in a first row are not adjacent to micro lenses in a row adjacent thereto in the second direction. Also, the geometric centers or optical axes of the first to fourth micro lenses ML1, ML2, ML3 and ML4 may lie at the corners of a parallelogram, respectively. The geometric centers or optical axes of the first to third micro lenses ML1, ML2 and ML3 may substantially form an equilateral triangle shape.

Otherwise, the image sensor system is similar to the image sensor system and any of the examples thereof described above with respect to FIGS. 1 to 9.

Figure 11:
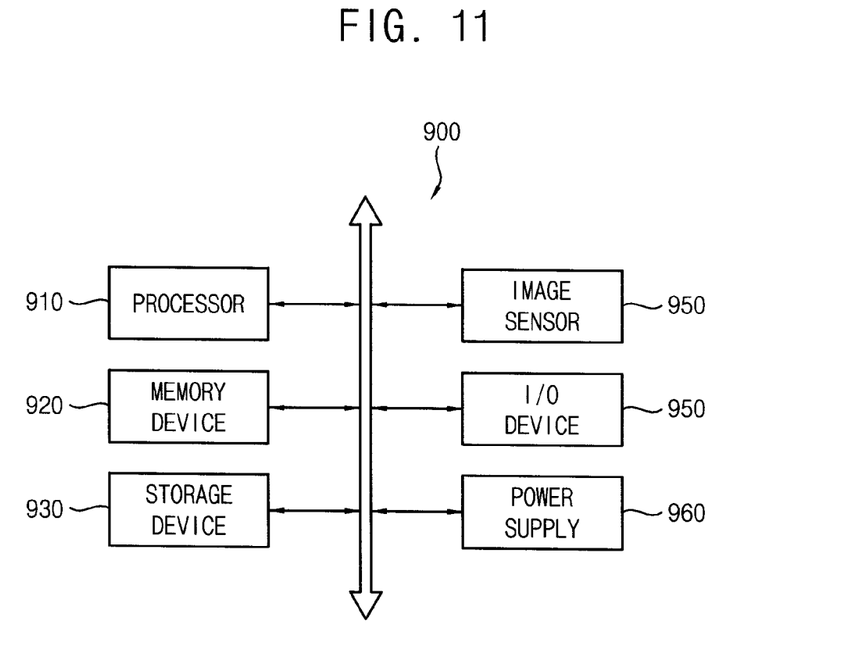
FIG. 11 is a block diagram of a computing system including an image sensor according to the inventive concept.

FIG. 11 illustrates a computing system including an image sensor, according to the inventive concept.

Referring to FIG. 11, a computing system 900 may include a processor 910, a memory device 920, a storage device 930, an image sensor system 940, an input/output (I/O) device 950 and a power supply 960. Although not illustrated in FIG. 11, the computing system 900 may further include ports that communicate with a video card, a sound card, a memory card, a universal serial bus (USB) device, or other electronic device.

The processor 910 may perform various calculations or tasks. For example, the processor 910 may be a microprocessor or a central processing unit (CPU). The processor 910 may communicate with the memory device 920, the storage device 930 and the I/O device 950 via an address bus, a control bus, and/or a data bus. In one example of this embodiment, the processor 910 is coupled to an extended bus, such as a peripheral component interconnection (PCI) bus.

The memory device 920 may store data for operating the computing system 900. For example, the memory device 920 may comprise at least one volatile memory device, e.g., a dynamic random access memory (DRAM) device, a static random access memory (SRAM) device, etc., and/or at least one nonvolatile memory device, e.g., an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc.

The storage device 930 may comprise a solid state drive (SSD), a hard disk drive (HDD), a CD-ROM, or the like. The I/O device 950 includes an input device (e.g., a keyboard, a keypad, a mouse, etc.) and an output device (e.g., a printer, a display device, etc.) The power supply 960 may supply operation voltages for the computing system 900.

The image sensor system 940 may communicate with the processor 910 via the bus or other communication links. The image sensor system 940 comprises any image sensor system as described with respect to FIGS. 1-10. In other words, the image sensor system 940 may include an image sensor and the DSP 500 generating the depth DEP of the input image and the characteristic value DIFF of the light source based on the plurality of polarized sub images and conducting the local auto white balancing based on the same. The image sensor includes the pixel array including the plurality of pixels, the micro lens array including the plurality of micro lenses juxtaposed with the pixel group of the pixel array and the plurality of polarizing filters disposed on the micro lenses and having at least two different polarizing phases. Therefore, the accuracy of the image sensing may be improved.

The image sensor system 940 may be packaged in various forms, such as in a package on package (PoP), ball grid array (BGAs), chip scale package (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

The image sensor system 940 and the processor 910 may be fabricated as one integrated circuit chip. Alternatively, the image sensor system 940 and the processor 910 may be fabricated as two separate integrated circuit chips. The computing system 900 may be any that of any product that employs an image sensor. For example, the computing system 900 may be that of a digital camera, a mobile phone, a smart phone, a portable multimedia player (PMP), a personal digital assistant (PDA), a personal computer, a server computer, a workstation, a laptop computer, a tablet computer, a digital television, a set-top box, a music player, a portable game console, or a navigation system.

Figure 12:
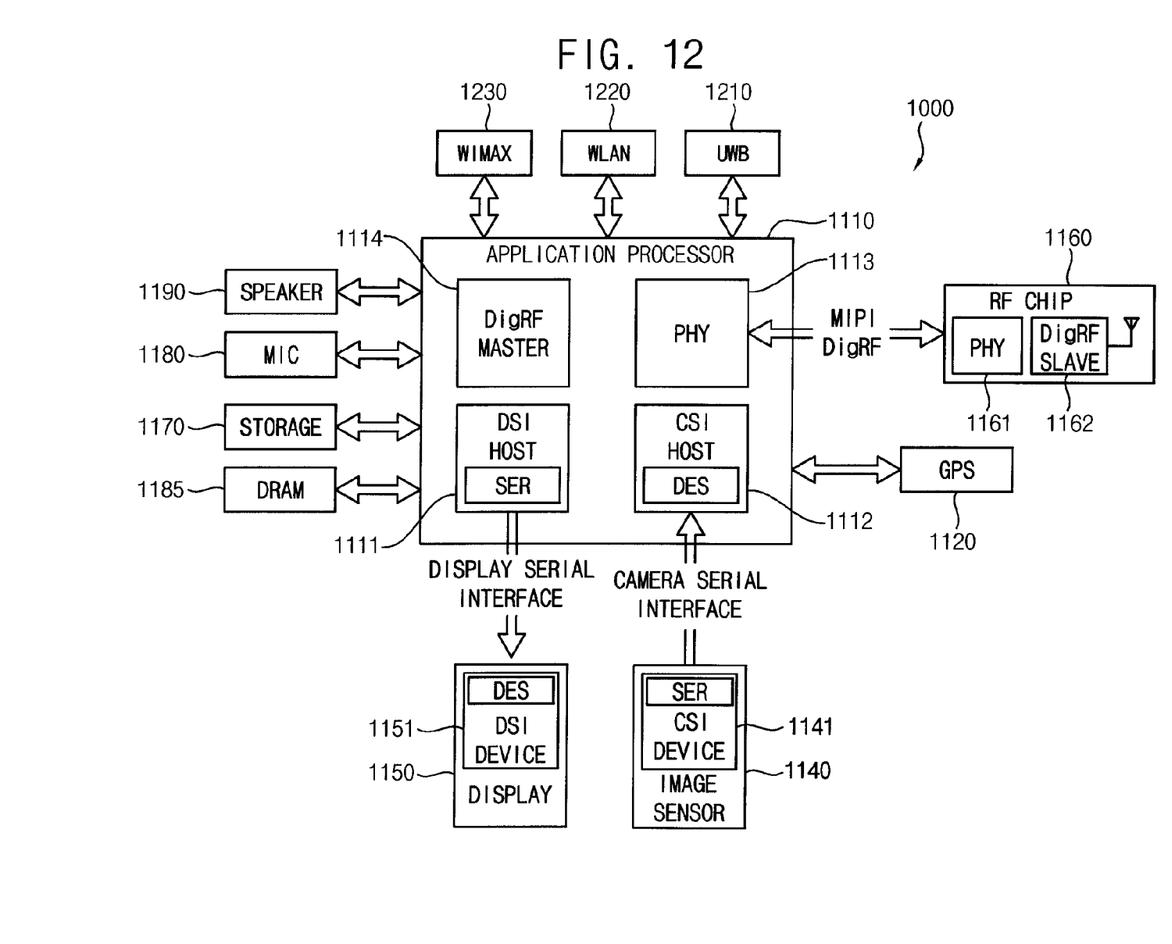
FIG. 12 is also a block diagram of a computing system including an image sensor according to the inventive concept.

FIG. 12 is a block diagram of a computing system including an image sensor, according to the inventive concept.

Referring to FIG. 12, the computing system 1000 may be realized as a data processing device that uses or supports a mobile industry processor interface (MIPI) interface. The computing system 1000 may include an application processor 1110, an image sensor system 1140, and a display device 1150.

A camera serial interface (CSI) host 1112 of the application processor 1110 may perform a serial communication with a CSI device 1141 of the image sensor system 1140 via a CSI. In an example of this embodiment, the CSI host 1112 includes a deserializer (DES), and the CSI device 1141 includes a serializer (SER). A display serial interface (DSI)

host 1111 of the application processor 1110 may perform a serial communication with a DSI device 1151 of the display device 1150 via a DSI. The DSI host 1111 may include a serializer (SER), and the DSI device 1151 may include a deserializer (DES).

The computing system 1000 may further include a radio frequency (RF) chip 1160 performing a communication with the application processor 1110. A physical layer (PHY) 1113 of the computing system 1000 and a physical layer (PHY) 1161 of the RF chip 1160 may perform data communications based on a MIPI DigRF. The application processor 1110 may further include a DigRF MASTER 1114 that controls the data communications of the PHY 1161. The RF chip 1160 may further include a DigRF SLAVE 1162 that is controlled through the DigRF MASTER 1114.

The computing system 1000 may further include a global positioning system (GPS) 1120, a storage 1170, a MIC 1180, a DRAM device 1185, and a speaker 1190. In addition, the computing system 1000 may perform communications using an ultra wideband (UWB) 1210, a wireless local area network (WLAN) 1220, a worldwide interoperability for microwave access (WIMAX) 1230, etc. However, the structure and the interface of the computing system 1000 are not limited to those described above.

The above described embodiments may be applied to an image sensor and an electronic system having the image sensor system. For example, the electronic system may be a system using the image sensor, e.g., a computer, a digital camera, a 3D camera, a cellular phone, a PDA, a scanner, a navigation system, a video phone, a surveillance system, an auto-focusing system, a tracking system, a motion-sensing system and/or an image-stabilization system.

As described above an image sensor and image sensor system according to the inventive concept may generate a plurality of polarized sub images using a plurality of polarizing filters having at least two different polarizing phases. A characteristic value of a light source and a relative depth are determined using the polarized sub images and a local auto white balancing is conducted based on the characteristic value of the light source and the relative depth. Thus, although various light sources exist or the input image data represents a monochromatic image, auto white balancing may yield a realistic image.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image sensor system comprising:
    an image sensor that generates signals representing an input image, the image sensor comprising:
        a pixel array including a plurality of pixels,
        a micro lens array disposed on the pixel array and including a plurality of micro lenses and a plurality of polarizing filters, each of the micro lenses being juxtaposed with a respective group of pixels of the pixel array, each of the polarizing filters being disposed on one of the micro lenses, and the polarizing filters having at least two different polarizing phases; and
    a signal processor operatively connected to the image sensor and configured to generate a plurality of polarized sub images based on the input image and to conduct an auto white balancing process based on the polarized sub images,
    wherein the signal processor comprises:
        a polarized sub image generating part configured to generate the polarized sub images based on the input image,
        a light source characteristic determining part configured to determine a characteristic value of a light source corresponding to a difference between the polarized sub images,
        a depth determining part configured to determine a depth of the input image based on the polarized sub images, and
        a local auto white balancing part configured to conduct local auto white balancing based on the characteristic value of the light source and the depth.

2. The image sensor system of claim 1, wherein the micro lenses include first and second micro lenses disposed adjacent to each other, and
    the plurality of polarizing filters comprise a first polarizing filter having a first polarizing phase and disposed on the first micro lens, and
    a second polarizing filter having a second polarizing phase different from the first polarizing phase and disposed on the second micro lens.

3. The image sensor system of claim 2, wherein the second micro lens is disposed adjacent to the first micro lens in a first direction,
    the micro lenses include a third micro lens, and a fourth micro lens disposed adjacent to the third micro lens in the first direction, and
    the plurality of polarizing filters comprise a third polarizing filter having a third polarizing phase and disposed on the third micro lens, the third micro lens being disposed adjacent to the first micro lens in a second direction, and
    a fourth polarizing filter having a fourth polarizing phase different from the third polarizing phase and disposed on the fourth micro lens.

4. The image sensor system of claim 3, wherein the first polarizing phase has a direction parallel to the second direction,
    the second polarizing phase has a direction rotated by 90 degrees with respect to the second direction,
    the third polarizing phase has a direction rotated by 45 degrees with respect to the second direction, and
    the fourth polarizing phase has a direction rotated by 135 degrees with respect to the second direction.

5. The image sensor system of claim 3, wherein the polarized sub image generating part is configured to generate as said polarized sub images a first polarized sub image using the first polarizing filter, a second polarized sub image using the second polarizing filter, a third polarized sub image using the third polarizing filter, and a fourth polarized sub image using the fourth polarizing filter.

6. The image sensor system of claim 5, wherein the light source characteristic determining part is configured to subtract a minimum polarized sub image grayscale value having the smallest luminance among those of the first to fourth polarized sub images from a maximum polarized sub image grayscale value having the greatest luminance among the first to fourth polarized sub images.

7. The image sensor system of claim 1, wherein the depth determining part is configured to determine the depth using a first disparity in a first direction in the pixel group juxtaposed with the micro lens and a second disparity in a second direction crossing the first direction in the pixel group juxtaposed with the micro lens.

8. The image sensor system of claim 1, wherein the local auto white balancing part is configured to generate a white balancing compensating value using the characteristic values of the light source of the pixel groups in a local window which has a depth which is the same as a depth of a central pixel group corresponding to a center of the local window.

9. The image sensor system of claim 8, wherein the white balancing compensating value is determined as a most frequent characteristic value of the light source among histograms of the characteristic values of the light source of the pixel groups in the local window which has the depth that is the same as the depth of the central pixel group.

10. The image sensor system of claim 8, wherein the white balancing compensating value is determined as an average of the characteristic values of the light source of the pixel groups in the local window which has the depth that is the same as the depth of the central pixel group.

11. An image sensor system, comprising:
an array of pixels that convert incident light to electronic signals;
an array of micro lenses optically aligned with the pixels so as to direct light onto the pixels;
polarizers optically aligned with the micro lenses such that light directed onto the pixels in the sensor by the micro lenses is polarized by the polarizers, wherein the polarizers have transmission axes that are substantially parallel, and respective ones of the polarizers having transmission orientations different from one another; and
a signal processor operatively connected to the array of pixels and configured to conduct an auto white balancing process based on the signals produced by the pixels, wherein the signal processor comprises:
a polarized sub image generating part configured to generate polarized sub images based on the signals produced by the pixels,
a light source characteristic determining part configured to determine a characteristic value of a light source corresponding to a difference between the polarized sub images,
a depth determining part configured to determine a depth of the input image based on the polarized sub images, and
a local auto white balancing part configured to conduct local auto white balancing based on the characteristic value of the light source and the depth.

12. The image sensor system of claim 11, wherein the array of pixels comprises an array of respective groups of pixels, and each of the micro lenses is optically aligned with the pixels of a respective one of the groups thereof.

13. The image sensor system of claim 11, wherein the micro lenses are disposed in a two-dimensional array in which each of the mirco lenses is disposed adjacent to others of the micro lenses in first and second directions, respectively,
the polarizers are disposed in a two-dimensional array such that the polarizers are optically aligned with the micro lenses, respectively, and each of the polarizers is disposed adjacent to others of the polarizers in the first and second directions, respectively, and
the transmission orientation of each of the polarizers is different from those of the polarizers disposed adjacent thereto in the first and second directions.

14. The image sensor system of claim 11, wherein the micro lenses are arranged in units, the transmission orientations of the polarizers optically aligned with the micro lenses of each unit of micro lenses are the same as the transmission orientations of the polarizers optically aligned with the micro lenses of each of the other units of micro lenses, and
the signal processor is configured to generate data of polarized sub-images each from signals output by the pixels that receive incident light polarized by the polarizers having the same transmission orientations.

* * * * *